US008799761B2

(12) United States Patent
Goel et al.

(10) Patent No.: US 8,799,761 B2
(45) Date of Patent: Aug. 5, 2014

(54) METHOD AND SYSTEM FOR REPURPOSING A SPREADSHEET TO SAVE PAPER AND INK

(75) Inventors: Naveen Goel, Uttar Pradesh (IN); Mayur Hemani, New Delhi (IN); Himanshu Jindal, Punjab (IN)

(73) Assignee: Adobe Systems Incorporated, San Jose, CA (US)

(*) Notice: Subject to any disclaimer, the term of this patent is extended or adjusted under 35 U.S.C. 154(b) by 81 days.

(21) Appl. No.: 12/849,349

(22) Filed: Aug. 3, 2010

(65) Prior Publication Data
US 2013/0132812 A1 May 23, 2013

(51) Int. Cl.
*G06F 17/00* (2006.01)

(52) U.S. Cl.
USPC .......................................................... 715/220

(58) Field of Classification Search
CPC ...................................................... G06F 3/1219
USPC .......................................................... 715/220
See application file for complete search history.

(56) References Cited

U.S. PATENT DOCUMENTS

| 6,128,655 | A | 10/2000 | Fields et al. |
| 6,266,684 | B1 | 7/2001 | Kraus et al. |
| 7,206,784 | B2 * | 4/2007 | Gu et al. ................................. 1/1 |
| 7,231,593 | B1 * | 6/2007 | Raja et al. ...................... 715/210 |
| 7,237,188 | B1 * | 6/2007 | Leung ............................ 715/209 |
| 7,366,981 | B2 | 4/2008 | Wu et al. |
| 7,599,094 | B2 * | 10/2009 | Sellers et al. .................. 358/2.1 |
| 7,680,858 | B2 | 3/2010 | Poola et al. |
| 7,882,427 | B2 * | 2/2011 | Raja et al. ...................... 715/212 |
| 8,024,412 | B2 | 9/2011 | McCann et al. |
| 8,085,421 | B2 | 12/2011 | Hamilton, II et al. |
| 8,305,653 | B2 | 11/2012 | Austin et al. |
| 8,397,155 | B1 | 3/2013 | Szabo |
| 8,407,579 | B2 * | 3/2013 | Raja et al. ...................... 715/212 |
| 8,451,489 | B1 | 5/2013 | Arora |
| 8,467,082 | B1 | 6/2013 | Miller et al. |
| 8,705,092 | B2 | 4/2014 | Goel et al. |
| 2002/0135800 | A1 * | 9/2002 | Dutta ............................ 358/1.15 |
| 2003/0110227 | A1 | 6/2003 | O'Hagan |
| 2003/0163537 | A1 | 8/2003 | Rohall et al. |
| 2004/0017577 | A1 | 1/2004 | Ostrover et al. |
| 2004/0019699 | A1 | 1/2004 | Dam et al. |

(Continued)

OTHER PUBLICATIONS

Curtis D. Frye, Excel Annoyances, Dec. 28, 2004, O'Reilly Media, Inc., 18 pages.*

(Continued)

*Primary Examiner* — Chau Nguyen
*Assistant Examiner* — Mohammed-Ibrahim Zuberi
(74) *Attorney, Agent, or Firm* — Wolfe-SBMC (57) ABSTRACT

A spreadsheet is repurposed to save paper and ink. An indication that a printout of a spreadsheet from a printer has been requested is received. The spreadsheet has content with a format that would result in a first quantity of pages being printed. Further, a printable range for the spreadsheet is determined. In addition, an overlap analysis of the spreadsheet is performed to determine if any of the plurality of shapes in the spreadsheet overlap one another. Each print zone is isolated in the spreadsheet. The print zone includes a group of cells. Each print zone is transformed into a transformed print zone. Further, a green spreadsheet is generated, without falling below a predetermined readability threshold, based on each transformed print zone such that the green spreadsheet has a second quantity of pages that is less than the first quantity of pages.

20 Claims, 6 Drawing Sheets

(56) References Cited

U.S. PATENT DOCUMENTS

| | | | |
|---|---|---|---|
| 2004/0044735 A1 | 3/2004 | Hoblit | |
| 2004/0049730 A1* | 3/2004 | Ishizaka | 715/503 |
| 2004/0068698 A1 | 4/2004 | Wu et al. | |
| 2004/0205607 A1 | 10/2004 | Kim et al. | |
| 2005/0004990 A1 | 1/2005 | Durazo et al. | |
| 2005/0231758 A1 | 10/2005 | Reynolds | |
| 2006/0015804 A1* | 1/2006 | Barton et al. | 715/503 |
| 2006/0167976 A1 | 7/2006 | Brown et al. | |
| 2007/0127064 A1 | 6/2007 | Kuroshima | |
| 2007/0273895 A1* | 11/2007 | Cudd et al. | 358/1.1 |
| 2008/0086695 A1 | 4/2008 | Oral | |
| 2008/0137132 A1* | 6/2008 | Perronnin | 358/1.15 |
| 2008/0159768 A1 | 7/2008 | Katoh et al. | |
| 2008/0288860 A1* | 11/2008 | Daviss | 715/243 |
| 2009/0063245 A1* | 3/2009 | Anderson | 705/9 |
| 2009/0100374 A1* | 4/2009 | Sheasby et al. | 715/788 |
| 2009/0119272 A1 | 5/2009 | Sastry | |
| 2009/0249193 A1 | 10/2009 | Hanechak | |
| 2010/0027051 A1* | 2/2010 | Hamilton et al. | 358/1.15 |
| 2010/0123908 A1 | 5/2010 | Denoue et al. | |
| 2010/0188681 A1* | 7/2010 | Kawano | 358/1.13 |
| 2010/0214614 A1 | 8/2010 | Ferlitsch et al. | |
| 2010/0235456 A1 | 9/2010 | Uchiyama et al. | |
| 2010/0281351 A1 | 11/2010 | Mohammed | |
| 2011/0032562 A1 | 2/2011 | McCuen et al. | |
| 2011/0043831 A1 | 2/2011 | Sprague et al. | |
| 2011/0145085 A1 | 6/2011 | Khachatrian et al. | |
| 2011/0235064 A1* | 9/2011 | Arai | 358/1.2 |
| 2011/0273739 A1 | 11/2011 | Grasso et al. | |
| 2012/0033237 A1 | 2/2012 | Arora et al. | |
| 2013/0128301 A1 | 5/2013 | Goel et al. | |
| 2013/0128314 A1 | 5/2013 | Chopra et al. | |
| 2013/0128315 A1 | 5/2013 | Arora et al. | |
| 2013/0132812 A1 | 5/2013 | Goel et al. | |
| 2013/0132817 A1 | 5/2013 | Sharad et al. | |

OTHER PUBLICATIONS

"Final Office Action", U.S. Appl. No. 12/849,231, (Oct. 24, 2012), 11 pages.

"Final Office Action", U.S. Appl. No. 12/849,475, (Aug. 20, 2012), 14 pages.

"Invent Wheel: Print What You Like Online Printing", *retrieved from* <http://www.inventwheel.com/web/articleDetailsByVersion.action?versionId=8> on Jan. 8, 2012, 3 pages.

"Non-Final Office Action", U.S. Appl. No. 12/849,231, (May 21, 2012), 12 pages.

"Non-Final Office Action", U.S. Appl. No. 12/849,306, (Oct. 9, 2012), 11 pages.

"Non-Final Office Action", U.S. Appl. No. 12/849,417, (Dec. 5, 2012), 12 pages.

"Non-Final Office Action", U.S. Appl. No. 12/849,475, (Jan. 19, 2012), 12 pages.

"PrintWhatYouLike.com", retrieved from <http://www.printwhatyoulike.com/> on Aug. 2, 2010, 2 pages.

Henry, Alan "Print Friendly for Chrome Lets You Easily Remove Unwanted Web Page Elements Before Printing", retrieved from <http://lifehacker.com5865826/print-friendly-for-chrome-lets-you-easily-remove-unwanted-web-page-elements-before-printing> on Jan. 8, 2012, (Dec. 7, 2011), 3 pages.

Remick, Jarel "Printing Pages with Print What You Like", *retrieved from* <http://web.appstorm.net/how-to/printing-pages-with-print-what-you-like/> on Jan. 8, 2012, 14 pages.

"Final Office Action", U.S. Appl. No. 12/849,306, (Apr. 25, 2013), 14 pages.

"Non-Final Office Action", U.S. Appl. No. 12/849,231, (Mar. 18, 2013), 14 pages.

"Non-Final Office Action", U.S. Appl. No. 12/849,519, (Mar. 1, 2013), 5 pages.

"Notice of Allowance", U.S. Appl. No. 12/849,519, (Apr. 15, 2013), 7 pages.

"Final Office Action", U.S. Appl. No. 12/849,475, Dec. 24, 2013, 12 pages.

"Final Office Action", U.S. Appl. No. 12/849,417, Sep. 4, 2013, 13 pages.

"Final Office Action", U.S. Appl. No. 12/849,231, Sep. 26, 2013, 17 pages.

"Advisory Action", U.S. Appl. No. 12/849,417, Nov. 14, 2013, 2 pages.

"Notice of Allowance", U.S. Appl. No. 12/846,417, Jan. 7, 2014, 8 pages.

"Notice of Allowance", U.S. Appl. No. 12/849,306, Nov. 22, 2013, 8 pages.

\* cited by examiner

METHOD AND SYSTEM FOR REPURPOSING A SPREADSHEET TO SAVE PAPER AND INK

BACKGROUND

1. Field

This disclosure generally relates to printing. More particularly, the disclosure relates to the reduction of paper and/or ink utilized for printing.

2. General Background

Recent attempts have been made to make technology more environmentally friendly. The resulting technologies are typically called green technologies. For example, green technologies have been developed for computers, automobiles, household appliances, etc.

With respect to computing technologies, a significant environmental concern stems from the printing of paper. Computer users may use compute printers to print large quantities of various types of spreadsheets, which typically leads to the use of large amounts of paper. A large demand for paper may lead to the destruction of large quantities of trees, which may have a negative impact on the environment.

As a result, computer users are typically encouraged to reduce the amount of paper utilized for printing by scaling multiple pages down to fit on a single page. A problem with this approach is that the readability and aesthetics of the page are severely hampered. A user may have such a difficult time reading text that has been miniaturized so that two or more pages may fit on one side of a sheet of paper (the other side may also have two or more pages) that the user may simply choose not to utilize green printing and may print in the typical manner, which would not be environmentally friendly.

SUMMARY

In one aspect of the disclosure, a computer program product is provided. The computer program product includes a computer useable medium having a computer readable program. The computer readable program when executed on a computer causes the computer to receive an indication that a printout of a spreadsheet from a printer has been requested. The spreadsheet has content with a format that would result in a first quantity of pages being printed. Further, the computer is caused to determine a printable range for the spreadsheet. In addition, the computer is caused to perform an overlap analysis of the spreadsheet to determine if any of the plurality of shapes in the spreadsheet overlaps one another. In addition, the computer is caused to isolate each print zone in the spreadsheet, the print zone including a group of cells. The computer is also caused to transform each print zone into a transformed print zone. Further, the computer is caused to generate, without falling below a predetermined readability threshold, a green spreadsheet based on each transformed print zone such that the green spreadsheet has a second quantity of pages that is less than the first quantity of pages.

In another aspect of the disclosure, a process is provided. The process receives an indication that a printout of a spreadsheet from a printer has been requested. The spreadsheet has content with a format that would result in a first quantity of pages being printed. Further, the process determines a printable range for the spreadsheet. In addition, the process performs an overlap analysis of the spreadsheet to determine if any of the plurality of shapes in the spreadsheet overlap one another. The process also isolates each print zone in the spreadsheet. The print zone includes a group of cells. The process also transforms each print zone into a transformed print zone. Further, the process generates, without falling below a predetermined readability threshold, a green spreadsheet based on each transformed print zone such that the green spreadsheet has a second quantity of pages that is less than the first quantity of pages.

In yet another aspect of the disclosure, a system is provided. The system includes a green print module that receives an indication that a printout of a spreadsheet from a printer has been requested. The spreadsheet has content with a format that would result in a first quantity of pages being printed. Further, the system has a processor that (i) determines a printable range for the spreadsheet, (ii) performs an overlap analysis of the spreadsheet to determine if any of the plurality of shapes in the spreadsheet overlap one another, (iii) isolates each print zone in the spreadsheet, (iv) transforms each print zone into a transformed print zone, and (v) generates, without falling below a predetermined readability threshold, a green spreadsheet based on each transformed print zone such that the green spreadsheet has a second quantity of pages that is less than the first quantity of pages. The print zone includes a group of cells.

In another aspect, a computer program product is provided. The computer program product includes a computer useable medium having a computer readable program. The computer readable program when executed on a computer causes the computer to receive a user selection of a group of cells from a plurality of spreadsheets. Further, the computer readable program when executed on the computer causes the computer to receive an indication that a printout of the group of cells from a printer has been requested. The group of cells has content with a format that would result in a first quantity of pages being printed. In addition, the computer readable program when executed on the computer causes the computer to determine a printable range for the group of cells. The computer readable program when executed on the computer also causes the computer to perform an overlap analysis of the group of cells to determine if any of the plurality of shapes in the group of cells overlap one another. Further, the computer readable program when executed on a computer causes the computer to isolate each print zone in the group of cells. In addition, the computer readable program when executed on a computer causes the computer to transform each print zone into a transformed print zone. The computer readable program when executed on the computer causes the computer to generate, without falling below a predetermined readability threshold, a green spreadsheet based on each transformed print zone such that the green spreadsheet has a second quantity of pages that is less than the first quantity of pages.

DRAWINGS

The above-mentioned features of the present disclosure will become more apparent with reference to the following description taken in conjunction with the accompanying drawings wherein like reference numerals denote like elements and in which.

DETAILED DESCRIPTION

A green printing configuration is provided herein that repurposes a spreadsheet to save paper and/or ink. The green printing configuration is a configuration that reduces the number of pages and/or ink utilized to print a spreadsheet through content repurposing, which is an approach that transforms content and the formatting of the content to shrink the size of the content to fit into fewer pages at the same time as retaining the readability and aesthetics of the spreadsheet. The green printing configuration may be a method, system, computing device, computer program stored on a computing device, computer program stored on a printer, computer module that may be downloaded through a network, plug-in, extension, etc. In one embodiment, a user may print in a single click to a default printer so that the content takes up fewer pages and/or less ink than a typical printed spreadsheet.

A spreadsheet may have content elements such as text, images, graphics, tables, etc. Further, a spreadsheet may have non-content elements such as layout constraints, text formatting, fonts, and spacing elements. Examples of layout constraints include page dimension, margins, gutters, and orientation. Each element contributes to the overall appearance of a spreadsheet. With respect to printing, the content in a spreadsheet cannot be significantly changed as the user will likely want to print the content in the spreadsheet. Accordingly, the green printing configuration maintains the content as a constant during the green printing of a spreadsheet.

The non-content elements primarily contribute to the visual appearance of the spreadsheet. For example, the non-content elements may function as separators for blocks of content, signifiers of importance, signifiers of relevance, and/or markers of relatedness. These non-content elements are the elements of formatting of the spreadsheet. The spreadsheet formatting contributes to certain redundancies in the spreadsheet by making the spreadsheet occupy more space. The green printing of a spreadsheet utilizes these redundancies in a manner that provides a quantifiable trade off between the number of pages and/or the amount of ink utilized by the content and the overall appearance of the spreadsheet.

A spreadsheet may have three types of redundancies. First, the spreadsheet may have a redundancy that affects that number of pages occupied by the content. Second the spreadsheet may have a redundancy that affects the amount of ink utilized to print the spreadsheet. Finally, the spreadsheet may have a redundancy that affects both the paper and the ink.

A spreadsheet may be considered a tabular document with no explicit pagination. In other words, a spreadsheet is a set of rows and columns of data. A spreadsheet program may have a spreadsheet workbook that includes one or more worksheets. A worksheet is a single large table of rows and columns. A cell is an intersection of a row and a column. The cell may be filled with textual data, numeric data, and/or formulae.

Spreadsheets have redundancies that are specific to a spreadsheet and are different than other types of documents such as word processing documents, presentation documents, etc. A cell may span multiple columns and/or rows. Accordingly, spreadsheets may have redundant empty rows and columns. Further, spreadsheets may also have wide margins. In addition, the data blocks of a spreadsheet may be laid out horizontally in regions that span an area bigger than the print media width, which may cause the spreadsheet program to print these logical tables on distinct sheets of paper. As a result, largely empty sheets of paper may be printed. Although a typical spreadsheet program may allow a user to mark the printable regions in every sheet and/or specify the number of pages the content is to be fit into, this approach is often too cumbersome for a user. Further, the scaling utilized by a typical spreadsheet program often leads to exceedingly small text that is barely readable. Further, the height of a row has to be the same for all columns in that row irrespective of how much space is needed for each data item, and the width of a column has to be same for all the rows in that column irrespective of how much space is needed for each data item. In addition, spreadsheets may also have shapes, e.g., charts, that have very large filled areas. Shapes may include text, graphics, images, or the like. These fills have associated semantics that in some instances should not be removed. A chart fill representing a distinct data series is an example of such semantics. A green printing approach minimizes these redundancies to reduce the size of the spreadsheet content.

Content repurposing may minimize or eliminate redundant white space in a spreadsheet. Further, content repurposing may reduce the size of large text in a spreadsheet. In other words, content repurposing automatically adjusts the format of the content according to the adjustments that a user would most likely want to see in order to reduce the number of pages in the spreadsheet so that the user can still comfortably read the spreadsheet.

The transformations utilized for content repurposing have the goal of reducing the overall redundancy in a spreadsheet. Although a group of transformations together may reduce the redundancy, one or more of the transformations may individually increase the redundancy. The redundancy for an individual transformation may be increased to accentuate certain characteristics of the spreadsheet to add to the aesthetic appeal and/or readability of the spreadsheet. For example, if and when a spreadsheet is printed with multiple pages per paper sheet, a green print program may automatically decide to increase the size of the text to make the text more readable.

A transformation may have a magnitude associated therewith. In one embodiment, the magnitude may be binary. The binary magnitude may indicate whether a transformation is applied is or not applied, e.g., "0" equals transformation is not to be applied and "1" equals transformation is to be applied. In another embodiment, the magnitude may have a set of predefined discrete values. In another embodiment, the magnitude may take continuous values.

Each instance of a transformation type may have a transformation cost associated therewith for a particular spreadsheet type. In other words, a particular sizing transformation may have a different transformation cost for a spreadsheet than for a different spreadsheet.

Further, each transformation may have an associated paper saving potential. For example, a particular textual transformation may save one tenth of a sheet of paper. In addition, each transformation may have an associated saved ink quantity. For example, a particular textual transformation may save one half an ounce of ink. The transformation may potentially have both a saved paper quantity and a saved ink quantity if both paper and ink would be saved as a result of the transformation.

Figure 1:
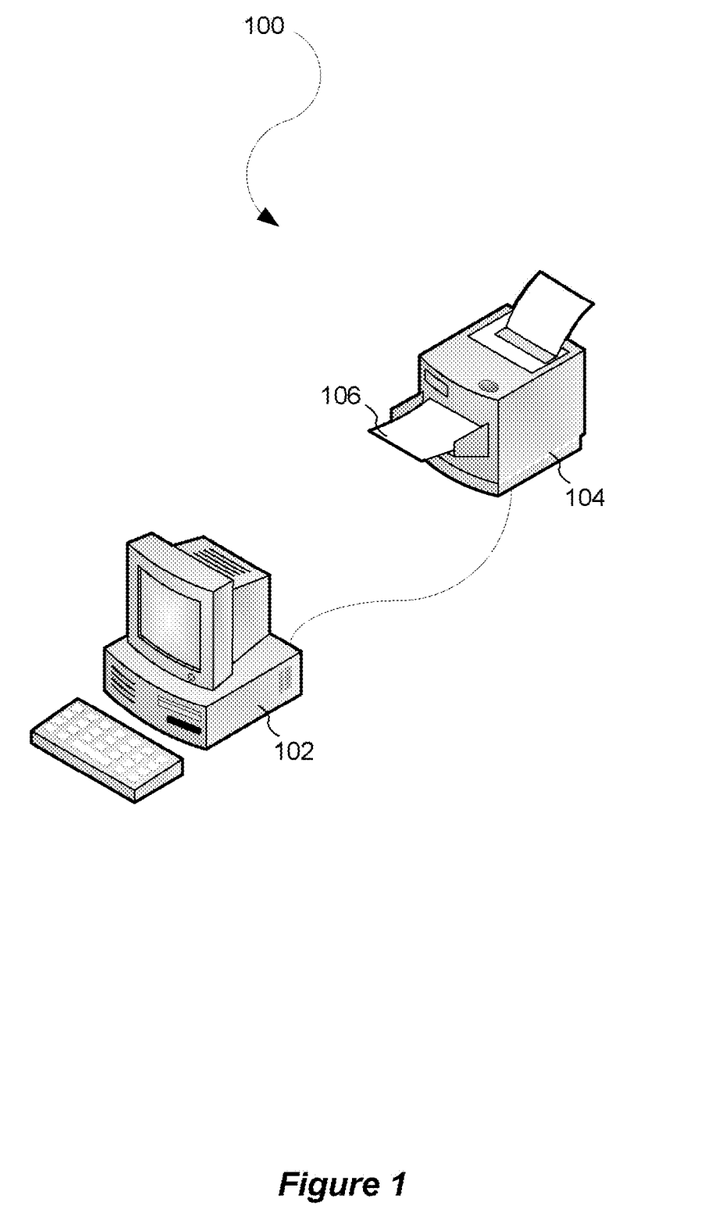
FIG. 1 illustrates a green printing configuration.

FIG. 1 illustrates a green printing configuration 100. As an example, a computing device 102 is illustrated as a PC. Further, as an example, the computing device 102 is operably connected to a printer 104 through a wireline connection. The term computing device 102 is herein intended to include a personal computer ("PC"), desktop computer, laptop, notebook, cell phone, smart phone, personal digital assistant ("PDA"), kiosk, etc. Further, the computing device 102 may be a server, client, network device, etc. The printer 104 may be a printing device that is separately connected, e.g., through a wireline or wireless connection, to the computing device 102, built into the computing device 102, etc. A wireless connection may receive and/or send data through a Radio Frequency ("RF") transmission, an Infrared ("IR") transmission, or the like. The printer may or may not be part of a network. Further, the printer 104 may utilize any type of printing methodology to print on paper 106, e.g. laser printing, ink jet printing, or the like.

In one embodiment, green printing for a spreadsheet utilizes transformations on three types of structures: (1) logical tables; (2) shapes; and (3) the spreadsheet as a whole. With respect to logical tables, the transformations reduce the size of the text, reduce the number and sizes of intervening empty rows, reduce the number and sizes of intervening empty columns, and eliminate the padding inside cells. With respect to shapes, the transformations remove the fill colors (if any) or replaces the fill colors with patterns or lighter fills. With respect to the spreadsheet as a whole, the transformations re-layout the content blocks identified in the spreadsheet on the spreadsheet to fit into the appropriate number of pages.

A green print module may be utilized with the green printing configuration 100. The green print module may be stored in the computing device 102 or the printer 104. The green print module may analyze the content of a spreadsheet to repurpose the content to save paper and/or ink.

Figure 2:
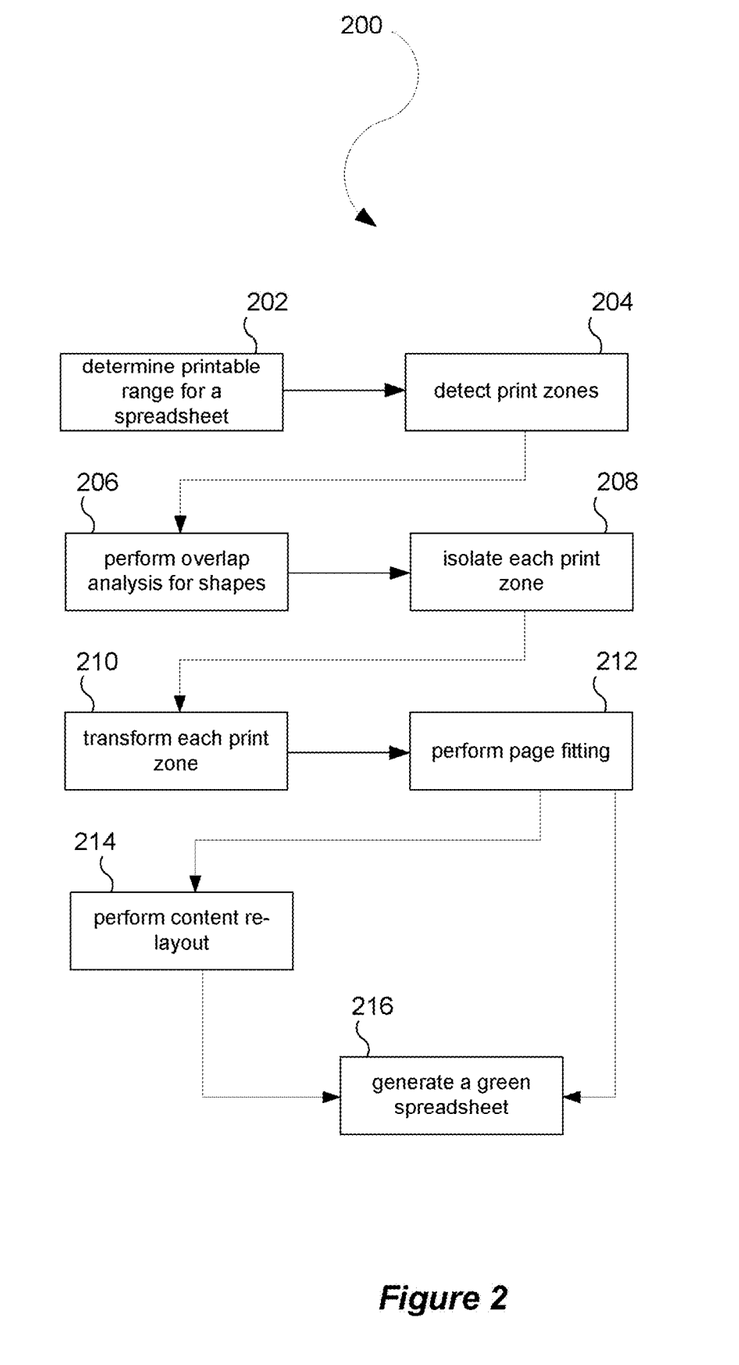
FIG. 2 illustrates a process that is utilized by the green print module to analyze a spreadsheet for the purpose of selecting one or more transformations to the spreadsheet for green printing.

FIG. 2 illustrates a process 200 that is utilized by the green print module to analyze a spreadsheet for the purpose of selecting one or more transformations to the spreadsheet for green printing. At a process block 202, the process 200 determines a printable range for a spreadsheet. Further, at a process block 204, the process 200 detects prints zones. In addition, at a process block 206, the process 200 performs overlap analysis for shapes. The overlap analysis helps identify which shapes overlap with other shapes and in what z-order. This information is useful during the removal of fills as the appearance of the shapes as they are should be maintained. At a process block 208, the process 200 isolates each print zone. Further, at a process block 210, the process 200 transforms each print zone. In addition, at a process block 212, the process 200 performs page fitting. The process 200 advances to a process block 214 to perform content re-layout if necessary. From the process block 214, the process 200 advances to a process block 216 to generate a green spreadsheet. The content re-layout is utilized to decide the final placement of the content in the output. For example, the scaling and placement decisions are made for the output. For instance, vertical gaps between groups, managing bounding boxes, or the like are handled. Further, the content re-layout may attempt a fit-to-page approach to fully utilize the pages that the content will occupy eventually. If the content re-layout was not necessary, the process 200 advances from the process block 212 to the process block 216 to generate the green spreadsheet. All of the illustrated process blocks in FIG. 2 are not required for operation of the process 200. In other words, a sub-combination of the process blocks illustrated in FIG. 2 may be utilized to operate the process 200. As an example, for performance reasons, the process block 204 that detects print zones may only be utilized if all the content shrinking, removal of white space, empty columns, etc. results in the content not fitting horizontally into a single page to be printed.

Figure 3A:
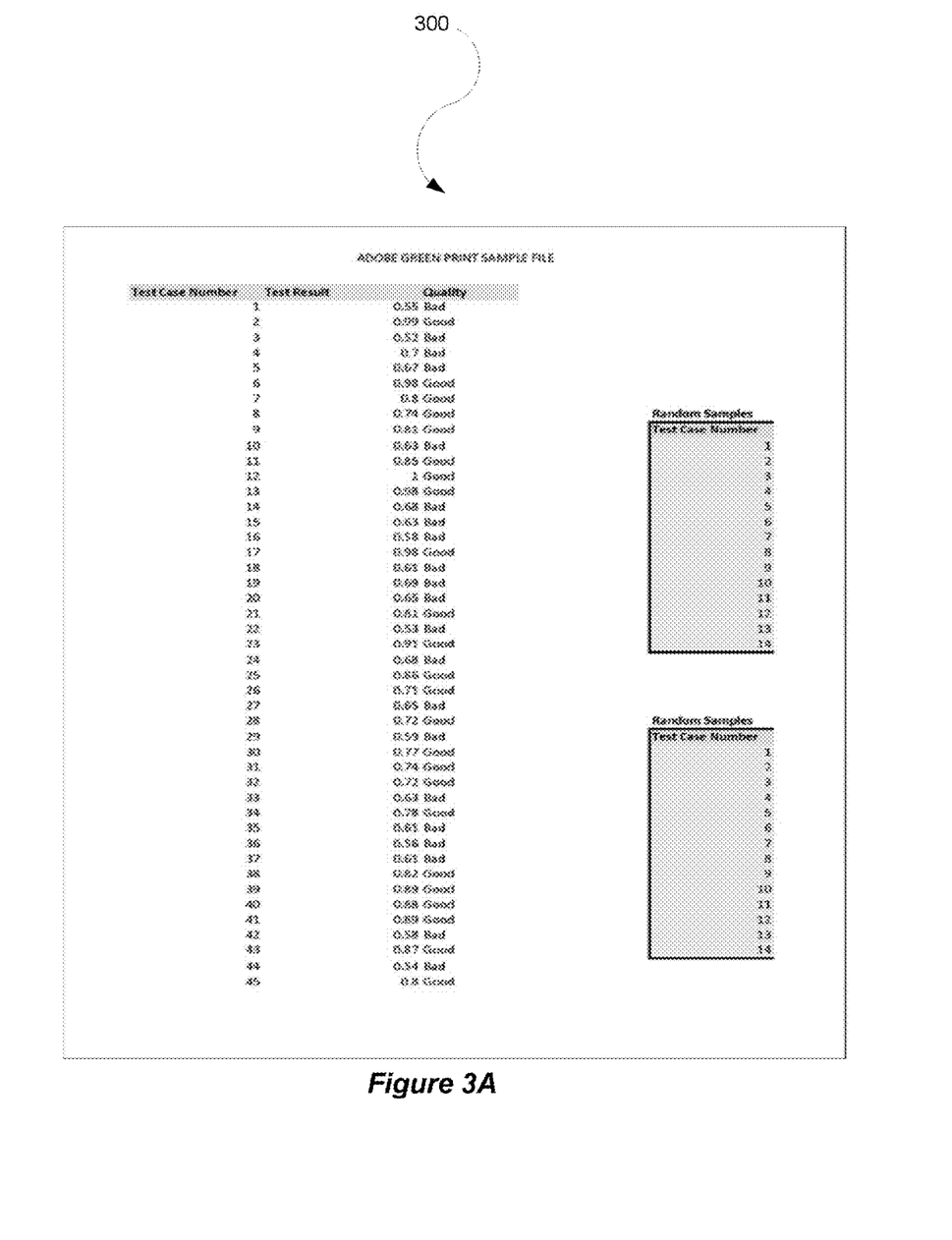
FIG. 3A illustrates an example of a first printable page of a spreadsheet in an original format.
Figure 3B:
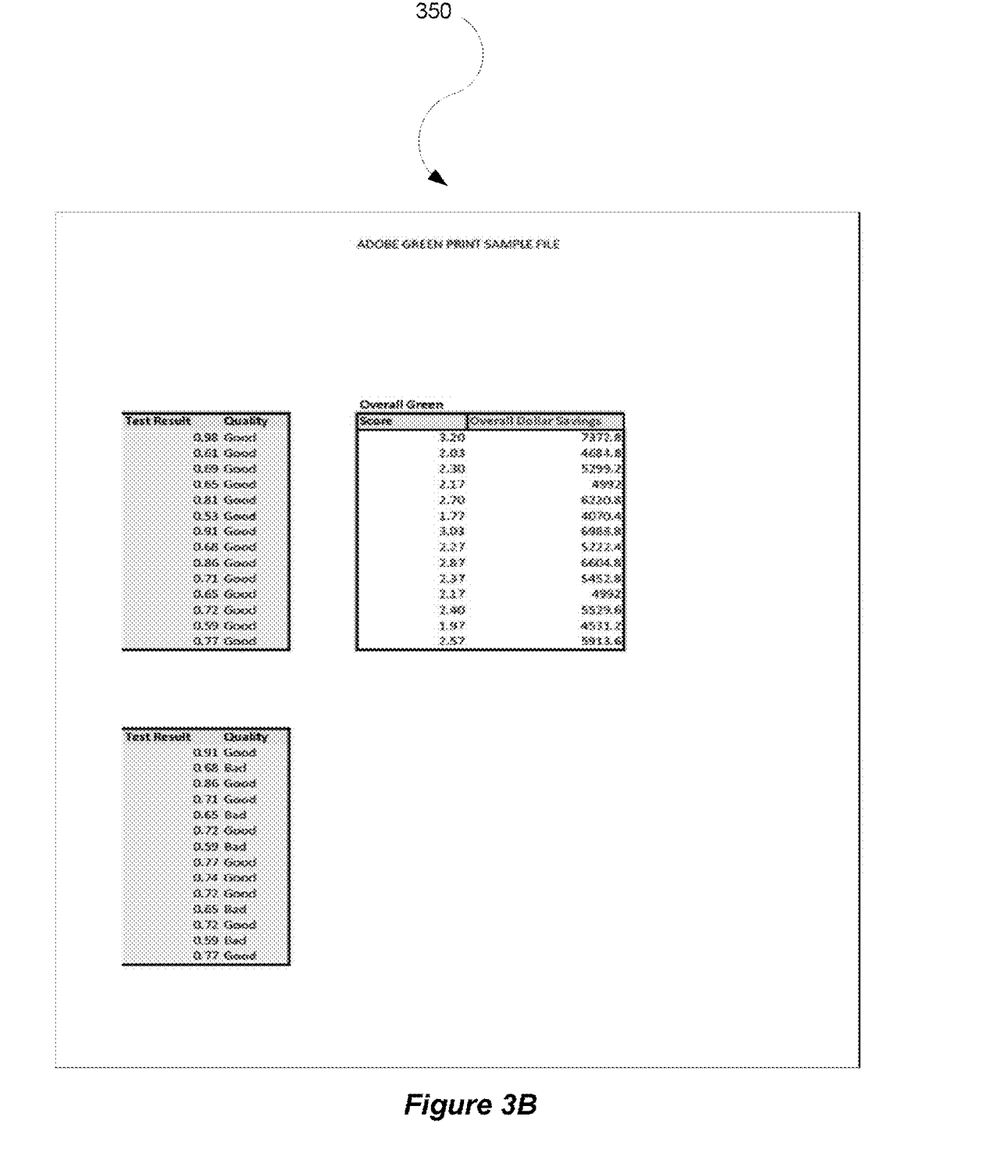
FIG. 3B illustrates an example of a second printable page of the spreadsheet in the original format.

FIG. 3A illustrates an example of a spreadsheet 300 in an original format. FIG. 3B illustrates an example of a green spreadsheet 350 after green printing transformations have been applied to the spreadsheet 300 illustrated in FIG. 3A.

By automatically reducing the number of pages from the original format that results in a first quantity of printed pages to a repurposed format that results in a second quantity of pages, the original appearance of the spreadsheet is lost. Accordingly, the trade-off between the appearance of the spreadsheet and the amount of savings achieved from green printing is quantified according to a repurposing quantifier. In one embodiment, the appearance of the spreadsheet is quantified in terms of aesthetic attributes and a measure of the influence of one or more transformations on the spreadsheet. In one embodiment, a readability threshold may be established to specify the degree to which the appearance of the spreadsheet may be degraded for the purpose of green printing. Further, the spreadsheet may be automatically repurposed without the distortion falling below the readability threshold. The readability threshold may be based one or more readability rules. Instead of basing the readability threshold on a subject measure of appearance, the readability threshold is based on specific measurements from the spreadsheet. Those specific measurements are utilized to determine the risks associated with transforming certain portions of the spreadsheet in view of the readability rules.

The quantification of the appearance of the green spreadsheet is based on the appearance of the output. With respect to a spreadsheet, the key appearance attributes are text legibility and fidelity of geometry. Text legibility may be presented by utilizing a step function. In one embodiment, a process is utilized to determine geometry fidelity. The geometry fidelity process arranges shapes in a predetermined dimension format. As an example, the shapes may be arranged in two and one half dimensions, i.e., the arrangement of the shapes includes an (X,Y) coordinate and a z-order. Shapes may also have rectangular dimensions, e.g., width and height. A shape with rectangular dimensions may be represented as two one-dimensional ranges and a z-index as ((X, X+W), (Y,Y+H), z). Further, the relative position of one shape S2 with respect to another shape S1 may be represented as a 9D point P ($BB_x$, $EB_x$, $EA_x$, $BA_x$, $BB_y$, $EB_y$, $EA_y$, $BA_y$, Z) where each coordinate is defined as follows. Z denotes the difference in the z-orders normalized as z-index/Num Shapes. The Functions Begins Before (BB), Ends Before (EB), Begins After (BA), and Ends After (EA) may be defined for an interval pair ($I_1$, $I_2$) such that $I_1=(x_1, x_2)$, $I_2=(x_1',x_2')$, $x_1<=x_2$, and $x_1'<=x_2'$. $BB(I_1,I_2)$ equals $(x_1'-x_1)/N$ (>0 if the interval I1 begins before interval $I_2$ begins, <=0 otherwise). $EB(I_1,I_2)=(x_2'-x_2)/N$ (>0 if the interval $I_1$ ends before interval $I_2$ ends, <=0 otherwise. $BA(I_1,I_2)=(x_1'-x_2)/N$ (>0 if the interval $I_2$ begins only after interval $I_1$ ends, <=0 otherwise). $EA(I_1,I_2)=(x_2'-x_1)/N$ (>0 if the interval $I_2$ ends only after interval $I_1$ begins, <=0 otherwise). Each of these functions is defined for the X and Y coordinates of the shape rectangles. N is the width of the spreadsheet W and height of the spreadsheet H respectively. As an example, $EA_y=(y_2'-y_1)/H$. Further, the point P represents the information about how shapes are arranged in space with respect to each other.

A transformation in a spreadsheet changes positions of the shapes and the shapes' sizes. In effect, the transformation modifies the positions, sizes, and/or the shapes' z-order. As a result, the relative positions of the shapes to one another may be changed. The distance between two states for a pair of shapes is defined as the Euclidean distance between the representations of the relative position of the two shapes with respect to each other. The distance has some particular properties. For instance, if the positions of the shapes are inverted, then the distance is large. An example of shapes being inverted is one shape being previously to the left the other and now being the other way around. If the sizes of the shapes are changed so that if previously they were not overlapping, but now they do overlap, the distance is large. The pair-wise relative positions of all shapes with respect to each other are determined before and after transformation. For example, Pos[i,j] may be determined for all i≠j in the spreadsheet before the transformation is applied. Subsequently, the pair-wise distances between all shapes is determined. For example, Pos'[i,j] for all i≠j in the spreadsheet after the transformation is applied. After the pair-wise distances are determined, the sum of all the distances is determined. For example, M equals $\rho\|(Pos[i,j], Pos'[i,j])\|$ where $\|D\|$ is the $L_2$-norm distance between the points.

The fidelity of geometry for a transformation is defined as $G=1/(1+(f^2*M)$ where $f_i$ is the apparent scaling ratio for the spreadsheet. This apparent scaling ratio is the ratio of the width of output shape by its input width for the transformation. The appearance score may then be determined as the aggregate score the text legibility Li and the fidelity of geometry. In other words, $P_i=G_i*L_i$. For text-free spreadsheets, the text legibility is assumed to be one, i.e., normal.

In one embodiment, transformations are filtered according to the kinds of rectangular cell groups and/or chart objects that are present in the spreadsheet and reconciled to make sure that the same transformations are applied to the same rectangular cell groups and/or chart objects. Because determining the overall appearance score is expensive, the overall appearance score may be avoided for large rectangular cell groups and/or chart objects. Every transformation may have an average rated impact in terms of papers savings, i.e., a number Ni for a transformation Ti. The transformations may be ranked by the combined rank (Ni*Pi).

In addition to determining an appearance score for a spreadsheet, logical cell groups may be identified and the re-layout for the logical cell groups in the spreadsheet for green printing may be determined. A spreadsheet program may splits rows and columns according to the page size in which they fit to print. As a result, the logical structure and the layout of the spreadsheet may be lost during printing. These logical groups of cells that form tables are not explicitly present in the spreadsheet. Spreadsheet authors sometimes utilize formatting and spacing to demarcate these tables. Through green printing, these groups of cells are identified in a spreadsheet. A heuristic model is utilized to expedite the process of identifying logical groups of cells, e.g., tables, in a spreadsheet so that the groups of cells may be formatted individually and placed in their entireties.

In one embodiment, the groups of cells are identified utilizing certain characteristics of regions in the spreadsheet. One such characteristic is the existence of one or more isolated regions. A rectangular group of cells form an isolated region if the cells are bounded by at least one blank row one at least one blank column on either side. As a result, no two isolated regions overlap. Further, the union of the all the isolated regions in the spreadsheet covers the entire utilized range of the spreadsheet. Another characteristic is merged region smoothness. A merged region is a region created from the merging of other regions. Yet another characteristic is merged region utilization. The utilization of a merged region is expressed as the ratio of the sum of areas of the merging blocks and the area of the merged block. This factor indicates how much area of the merged region is vacant. These cell groups may be identified as follows. The set of isolated regions R is found in the spreadsheet. Further, one or more heuristic rules may be utilized to grow the regions in R, which output the logical tables in the spreadsheet. For every region P in R, the following actions are performed. The set of regions S that share a common edge with P are found. The regions in Scan either share a horizontal edge or a vertical edge of R. As, a result four possibilities may exist: (1) none of them are merged with P; (2) all regions that share a vertical edge, i.e. are in the same horizontal rows, are merged with P; (3) all regions that share a horizontal edge, i.e., are in the same vertical columns, are merged with P; (4) all regions that share a vertical edge and a horizontal edge are merged with P. The decision on which of these four possibilities is chosen is based on the following factors: the sizing of combining the regions, the space utilization factor of the merged region, and smoothness of the merged region. With respect to the sizes of the combined regions, if the size of the combined region is small enough so that it can be fit in a page, the combination is chosen. Alternatively, if the size of the combined region is large and after scaling cannot fit into a single page, the combined region is rejected. With respect to the smoothness of the merged region, the merged rectangle after the region is combined should not intersect with other regions. Further, the merged rectangle should not be L-shaped region. The selection is the merged region merged (P). Further, for every region P' in R, if P' was merged with merged (P), P' is removed from R. In addition, P is removed from R. The new merged (P) is then added to R. After the foregoing determination has been made with respect to all the regions present in the set R, a determination is made as to whether the regions in R may or may not be placed effectively. For example, if any region in R has a size greater than the page size, that region is not placed. Further, if the regions in R are very close to shapes, those regions are either merged with the shapes to make a bigger region or are not placed. The regions are merged with the shapes if the resulting region can fit in a page.

Figure 3C:
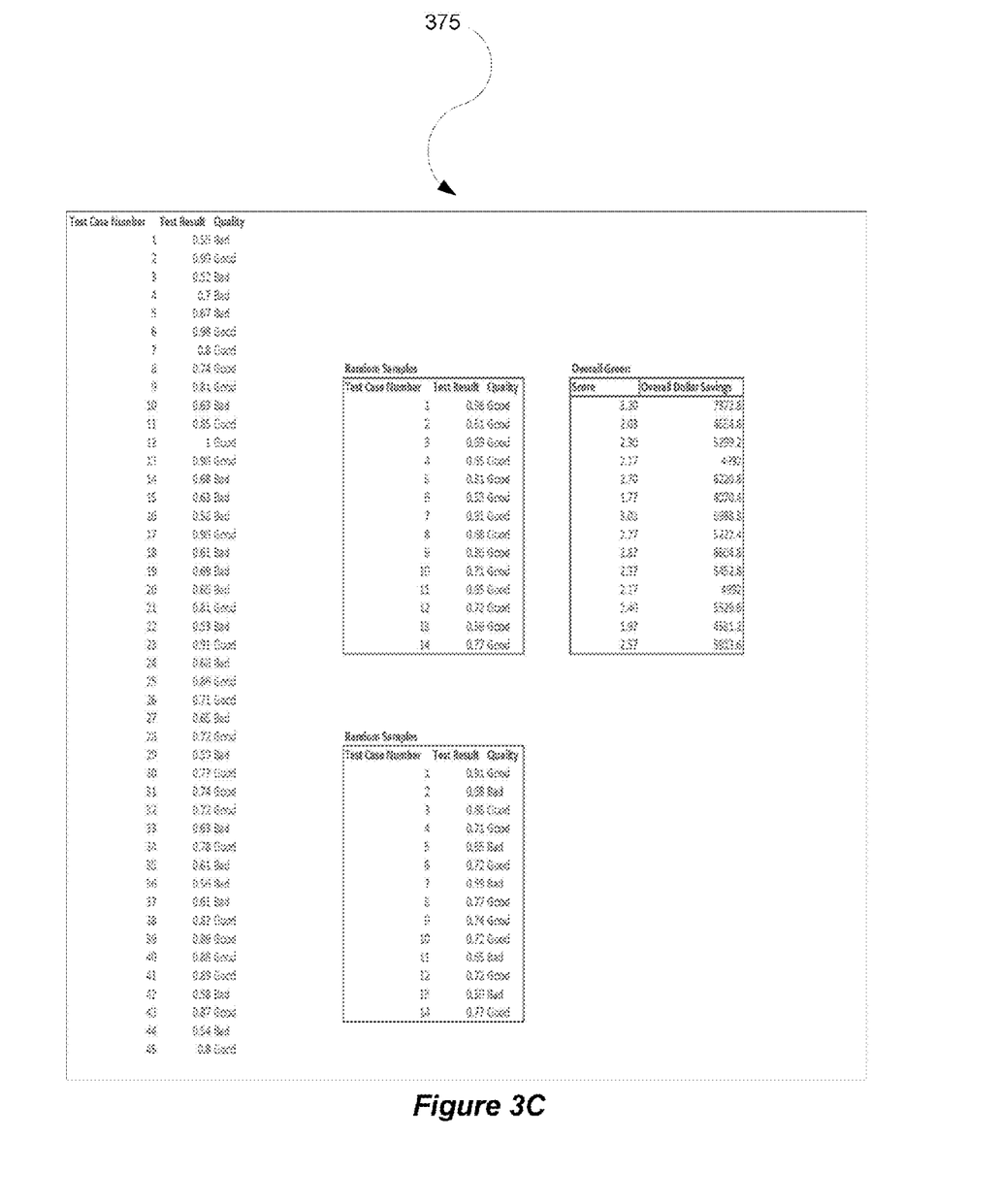
FIG. 3C illustrates a green spreadsheet after green printing transformations have been applied to the first printable page and the second printable page of the spreadsheet in the original format.

FIG. 3A illustrates an example of a first printable page 300 of a spreadsheet in an original format. Further, FIG. 3B illustrates an example of a second printable page 350 of the spreadsheet in the original format. FIG. 3C illustrates a green spreadsheet 375 after green printing transformations have been applied to the first printable page 300 and the second printable page 350 of the spreadsheet in the original format.

In another embodiment, the green printing configuration 100 may be utilized to green print content from multiple spreadsheets. A user may select cell groups from different spreadsheets to print. A user may also select entire spreadsheets to print. The user may choose to print one or more cell groups from a first spreadsheet together with an entire second spreadsheet that is different from the first spreadsheet. The green printing configuration allows a user to easily select content from multiple spreadsheets and print that content together. Further, the green printing configuration 100 allows the user to select and print content from multiple views of the same spreadsheet. As an example, the user may apply filters or moving pivots in a pivot table. All the printable regions are detected. The user is then provided with an interface to select content blocks to be added to a print cart. Accordingly, the print cart has information about which blocks information should be gathered from. After the user has completed the selection and provides an indication of that completed selection, the content blocks are automatically formatted and arranged on pages to green print the content. In one embodiment, the content order may be user-modifiable. As an example, the user may drag and drop items to order the content. As another example, the user may reorder a list showing shape thumbnails. In another embodiment, the content order may be decided by proximity. As an example, content form the same spreadsheet may be placed next to each other. As another example, charts derived from a table may be placed next to the table. As yet another example, multiple views of the same table/spreadsheet may be placed next to each other.

Figure 4:
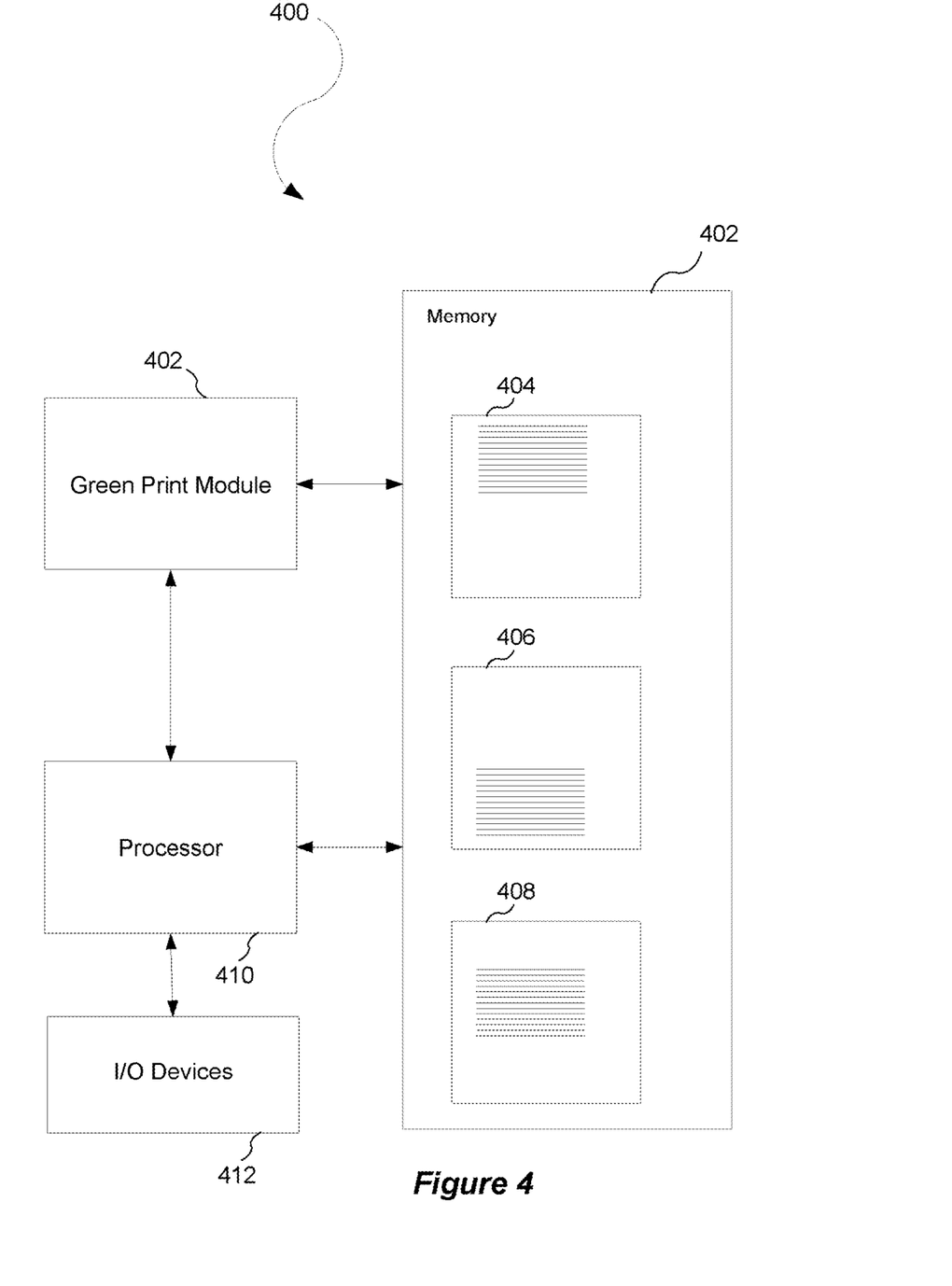
FIG. 4 illustrates a system configuration that may be utilized for green printing.

FIG. 4 illustrates a system configuration 400 that may be utilized for green printing. In one embodiment, a green print module 402 interacts with a memory 402. The green print module 402 generates a variety of potential repurposed spreadsheets that meet the readability threshold. For example, a first potential repurposed spreadsheet 404 may have content according to one format that meets the readability threshold, a second potential repurposed spreadsheet 406 may have content according to another format that meets the readability threshold, and a third potential repurposed spreadsheet 408 may have content according to yet another format that meets the readability threshold. Lines are provided in the various potential green spreadsheets as illustrated in drawings such as FIG. 4 to represent text, symbols, shapes, images, and/or the like. The green print module 402 may select one final repurposed spreadsheet from these potential repurposed spreadsheets by utilizing the repurposing quantifier. The repurposing quantifier may be the result of an equation that is based on the number of pages reduced and the degradation of the readability. Even if all of the potential repurposed spreadsheets meet the readability threshold, a higher score will generally be given to a first repurposed spreadsheet that degrades readability less than a second repurposed spreadsheet with the same number of reduced pages. Further, even if all of the potential repurposed spreadsheets meet the readability threshold, a higher score will generally be given to a first repurposed spreadsheet that reduces more pages than a second repurposed spreadsheet with the same readability degradation. In other words, the highest score will be given to the potential repurposed spreadsheet that as a whole minimizes readability degradation and maximizes page reduction better than the other potential repurposed spreadsheets.

After the green print module 402 selects a potential repurposed spreadsheet, the green print module 402 provides the repurposed spreadsheet to a processor 410. Further, the processor 410 applies the transformations in the potential repurposed spreadsheet to the spreadsheet so that the user may print the final repurposed spreadsheet. The processor 410 interacts with input/output ("I/O") devices 412. For example, the processor 410 receives an input from a user through a keyboard to print the spreadsheet. The processor 410 may then print the repurposed spreadsheet on a printer.

In one embodiment, the system configuration 400 is suitable for storing and/or executing program code and is implemented using a general purpose computer or any other hardware equivalents. The processor 410 is coupled, either directly or indirectly, to the memory 402 through a system bus. The memory 402 can include local memory employed during actual execution of the program code, bulk storage, and/or cache memories which provide temporary storage of at least some program code in order to reduce the number of times code must be retrieved from bulk storage during execution.

The I/O devices 412 can be coupled directly to the system 400 or through intervening input/output controllers. Further, the I/O devices 412 can include a keyboard, a keypad, a mouse, a microphone for capturing speech commands, a pointing device, and other user input devices that will be recognized by one of ordinary skill in the art. Further, the I/O devices 412 can include output devices such as a printer, display screen, or the like. Further, the I/O devices 412 can include a receiver, transmitter, speaker, display, image capture sensor, biometric sensor, etc. In addition, the I/O devices 412 can include storage devices such as a tape drive, floppy drive, hard disk drive, compact disk ("CD") drive, etc.

Network adapters may also be coupled to the system configuration 400 to enable the system configuration 1000 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A computer program product comprising a computer useable storage device having a computer readable program, such that the computer readable program when executed on a computer causes the computer to:

receive an indication that a printout of a spreadsheet has been requested, the spreadsheet having content with a format that would result in a first quantity of pages being printed;

determine a printable range for the spreadsheet;

automatically perform an analysis of the spreadsheet to determine if any of a plurality of isolated regions in the spreadsheet share a horizontal or vertical edge;

automatically merge two or more of the plurality of isolated regions in the spreadsheet based at least in part on the analysis;

automatically determine each print zone in the spreadsheet, including a print zone based at least in part on the merged region, each said print zone including a group of cells that contain logically related content;

automatically transform each said print zone into a transformed print zone; and automatically generate, without falling below a predetermined readability threshold, a green spreadsheet comprising each transformed print zone such that the green spreadsheet has a second quantity of pages that is less than the first quantity of pages.

2. The computer program product of claim 1, wherein the computer is further caused to perform a content re-layout to determine placement of each transformed print zone.

3. The computer program product of claim 1, wherein the computer is further caused to perform page fitting.

4. The computer program product of claim 1, wherein each said isolated region is a rectangular group of cells that is bounded by at least one blank row and at least one blank column on either side.

5. The computer program product of claim 1, wherein said determining of each said print zone is based at least in part on merged region smoothness according to the analysis.

6. The computer program product of claim 1, wherein said determining of each said print zone is based at least in part on merged region utilization, including a ratio of a sum of areas of a merging group of cells and an area of a merged block.

7. A computer comprising:
one or more programmable processors; and
a storage device communicatively coupled with the one or more programmable processors and tangibly embodying instructions operable to cause the one or more programmable processors to perform operations comprising:
receiving an indication that a printout of a spreadsheet has been requested, the spreadsheet having content with a format that would result in a first quantity of pages being printed;
automatically performing an analysis of the spreadsheet to determine if any of a plurality of isolated regions in the spreadsheet share a horizontal or vertical edge;
automatically merging two or more of the plurality of isolated regions in the spreadsheet based at least in part on the analysis, the two or more of the plurality of isolated regions containing logically related content;
automatically determining each print zone in the spreadsheet, including a print zone based at least in part on the merged region, each said print zone including a group of cells; and
automatically generating a green spreadsheet such that the green spreadsheet has a second quantity of pages that is less than the first quantity of pages.

8. The computer of claim 7, the operations further comprising performing a content re-layout to determine placement of each print zone.

9. The computer of claim 7, the operations further comprising performing page fitting.

10. The computer of claim 7, wherein each said isolated region is a rectangular group of cells that is bounded by at least one blank row and at least one blank column on either side.

11. The computer of claim 7, wherein said determining of each said print zone is based at least in part on merged region smoothness of the merged region according to the analysis.

12. The computer of claim 7, the operations further comprising:
determining a sum of areas of the two or more of the plurality of isolated regions;
determining an area of the print zone based at least in part on the merged two or more of the plurality of isolated regions;
calculating a space utilization of the respective print zone based at least in part on the sum of the areas of the two or more of the plurality of isolated regions and the area of the respective print zone; and
determining which of the plurality of isolated regions to include in said merging based at least in part on the space utilization.

13. The computer of claim 7, the operations further comprising:
selecting the two or more of the plurality of isolated regions based at least in part on the two or more of the plurality of isolated regions not intersecting other isolated regions of the plurality of isolated regions.

14. The computer of claim 7, the operations further comprising:
selecting the two or more of the plurality of isolated regions based at least in part on the two or more of the plurality of isolated regions not being L-shaped when merged.

15. The computer of claim 7, wherein the content of the spreadsheet is not changed during said operations.

16. A computer comprising:
one or more programmable processors; and
a storage device communicatively coupled with the one or more programmable processors and tangibly embodying instructions operable to cause the one or more programmable processors to perform operations comprising:
receiving an indication that a printout of a group of cells has been requested, the group of cells having content with a format that would result in a first quantity of pages being printed;
automatically performing an analysis of the group of cells to determine if any of a plurality of isolated regions in the group of cells share a horizontal or a vertical edge;
automatically merging two or more of the plurality of isolated regions based at least in part on the analysis;
automatically determining each print zone in the group of cells, including a print zone based at least in part on the merged region, and each said print zone containing logically related content;
automatically transforming each print zone into a transformed print zone; and
automatically generating a green spreadsheet comprising each transformed print zone such that the green spreadsheet has a second quantity of pages that is less than the first quantity of pages.

17. The computer of claim 16, wherein said receiving the indication includes receiving a user selection of the group of cells from a plurality of spreadsheets.

18. The computer of claim 16, the operations further comprising automatically removing fills from at least one of the isolated regions.

19. The computer of claim 16, wherein at least one of the isolated regions includes a chart.

20. The computer of claim 16, the operations further comprising:
automatically determining two or more shapes in the group of cells overlap; and
merging the two or more shapes based at least in part on said determining the two or more shapes overlap; and
transforming the merged two or more shapes into a transformed print zone.

* * * * *